United States Patent
Wagner et al.

[15] 3,705,539
[45] Dec. 12, 1972

[54] PHOTOGRAPHIC APPARATUS WITH DETACHABLE SOURCE OF ARTIFICIAL LIGHT

[72] Inventors: Karl Wagner, Ottobrunn; Klaus Nicolai, Grunwald; Gerhard Schuchardt; Johann Putscher, both of Munich, all of Germany

[73] Assignee: Agfa-Gevaert Aktiengesellschaft, Leverkusen, Germany

[22] Filed: June 10, 1971

[21] Appl. No.: 151,646

[30] Foreign Application Priority Data

June 12, 1970 Germany.................P 20 29 140.1
June 12, 1970 Germany.................P 20 29 139.8

[52] U.S. Cl. ..............95/11.5 R, 95/11 L, 240/1.3
[51] Int. Cl. ....................G03b 15/04, G03b 15/03
[58] Field of Search....95/11.5 R, 11 R, 11 L, 31 AC; 240/1.3, 37, 37.1; 431/92, 93

[56] References Cited

UNITED STATES PATENTS

| 3,357,329 | 12/1967 | Nerwin | 95/11 L |
| 3,399,376 | 8/1968 | Rigolini | 240/1.3 X |
| 3,353,467 | 11/1967 | Ernisse et al. | 95/11 L |
| 3,502,012 | 3/1970 | Takeuchi | 95/11.5 R |
| 3,527,150 | 9/1970 | Montalto | 95/11 L |

Primary Examiner—Robert P. Greiner
Attorney—Michael S. Striker

[57] ABSTRACT

The body of a still camera has a fixedly mounted socket for reception of the foot of a flashcube which is rotatable with reference to the socket in order to place successive lamps into an optimum position for illumination of the subject. The flashcube can be rotated by way of its foot or by way of its casing and the socket is provided with a detent structure which can yieldably hold the flashcube in a selected position. The means for rotating the flashcube constitutes the film transporting and/or the shutter actuating mechanism of the camera.

40 Claims, 6 Drawing Figures

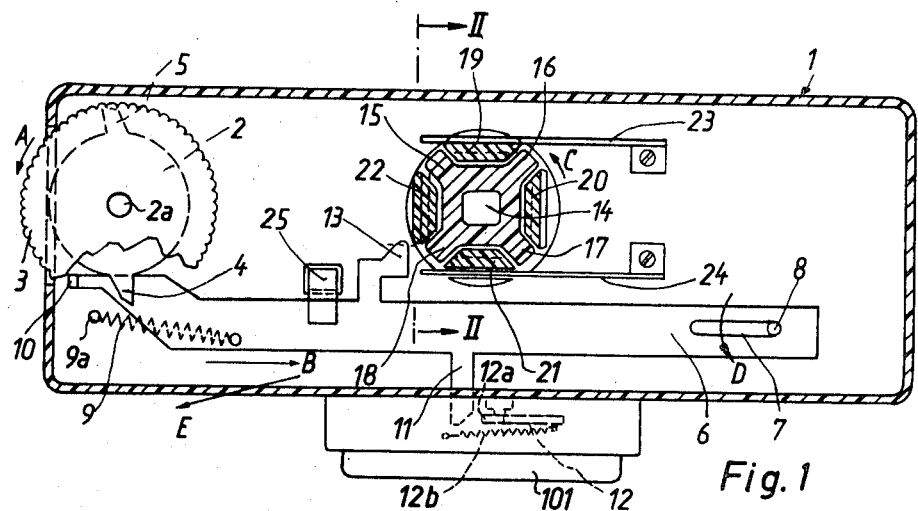
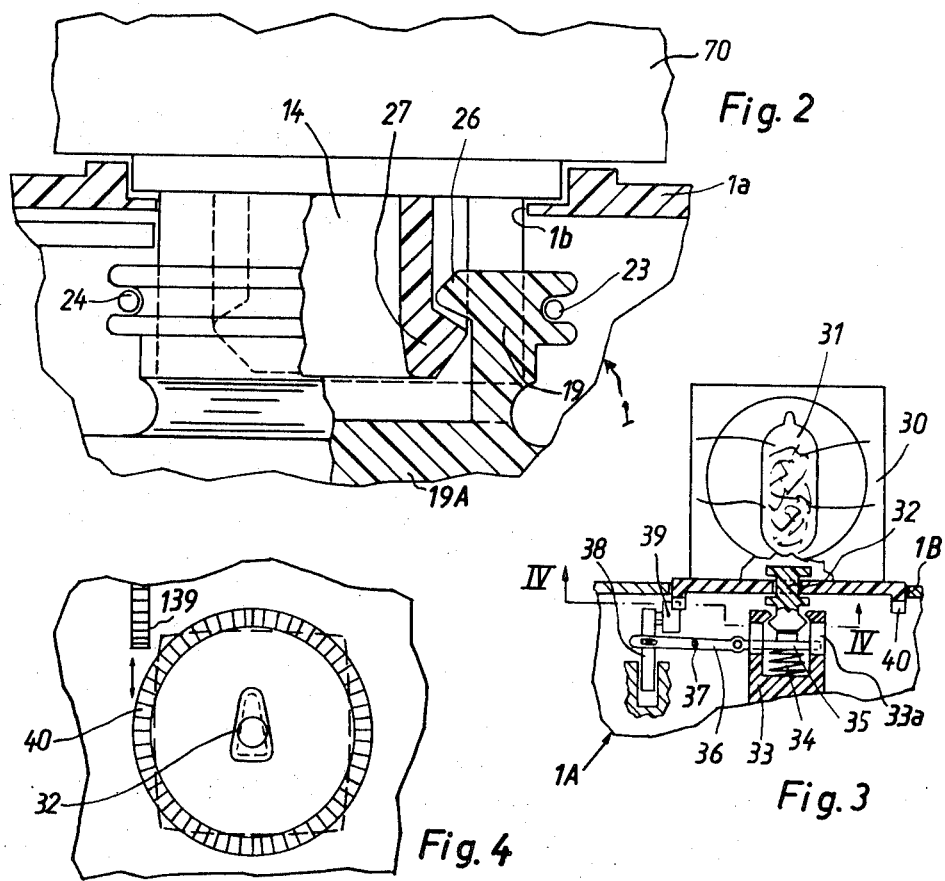

PHOTOGRAPHIC APPARATUS WITH DETACHABLE SOURCE OF ARTIFICIAL LIGHT

BACKGROUND OF THE INVENTION

The present invention relates to photographic apparatus in general, especially to still cameras, and more particularly to improvements in photographic apparatus which can be used with detachable sources of artificial light such as flashcubes, electronic flash units or the like. Still more particularly, the invention relates to improvements in photographic apparatus for use with detachable or replaceable sources of artificial light which are movable with reference to the camera body.

It is already known to mount a detachable source of artificial light on the body of a camera in such a way that the source is movable between several discrete positions. Thus, when the light source is a flashcube, the latter is indexible with reference to the camera body between several discrete positions so as to place successive lamps into an optimum position for illumination of a subject of scene. Such cameras are invariably provided with a socket which is rotatably mounted in the camera body and receives the foot of a flashcube in such a way that the foot shares all rotary movements of the socket. The socket can be rotated by the film transporting mechanism, by the shutter actuating mechanism or by hand.

A drawback of the just described cameras is that the mounting of a rotary socket in the body of the camera necessitates the provision of bearings, accurately finished surfaces and/or other accessories which contribute to the initial cost of the camera.

SUMMARY OF THE INVENTION

An object of the invention is to provide a photographic apparatus which can be used with detachable sources of artificial light and wherein a properly mounted source of artificial light can be moved with reference to the camera body without necessitating the provision of a rotary socket or the like.

Another object of the invention is to provide a photographic apparatus which can be used with different types of sources of artificial light and wherein the cost of the equipment which is needed to move the source with reference to the body is less than in presently known apparatus.

A further object of the invention is to provide a photographic apparatus with novel and improved means for rotating a flashcube or an analogous source of artificial light.

An additional object of the invention is to provide a photographic apparatus with novel means for rotating or otherwise moving a detachable source of artificial light in response to a manipulation which is necessary for normal operation of the apparatus, such as the transport of photographic film or the actuation of the shutter.

The invention is embodied in a photographic apparatus which comprises a body or housing, a first coupling member which is provided in the body and may constitute a socket, a source of artificial light (such as a rotary flashcube or a reciprocable source with one or more rows of flash lamps or electronic flash units) having a second coupling member which is movably connected with the first coupling member so that the second coupling member can move relative to the first coupling member, and drive means mounted on or in the body and actuatable to move the source with the second coupling member with reference to the first coupling member. Thus, instead of being movable with reference to the body, the first coupling member can be fixedly secured to the body in such a way that it can releasably engage and hold the second coupling member but permits the second coupling member and the source to move with reference thereto and hence with reference to the body in response to actuation of the drive means.

The drive means may form part of or it may constitute the film transporting mechanism or the shutter cocking or opening mechanism. Furthermore, the drive means may perform other functions, such as controlling the movements of one or more impellers of the type used in certain sources of artificial light to cause the firing of flash lamps in response to transmission of impacts to impulse-responsive cartridges or to cause the firing of flash units by transmitting impacts to piezoelectric elements which thereby produce high-voltage pulses necessary for the firing of flash units as described in U.S. Pat. No. 2,972,937. A device with five flash lamps is described in U.S. Pat. No. 3,528,353.

The novel features which are considered as characteristic of the invention are set forth in particular in the appended claims. The improved photographic apparatus itself, however, both as to its construction and its mode of operation, together with additional features and advantages thereof, will be best understood upon persual to the following detailed description of certain specific embodiments with reference to the accompanying drawing.

BRIEF DESCRIPTION OF THE DRAWING

FIG. 1 is a schematic horizontal sectional view of a photographic apparatus for use with flashcubes which embodies one form of the invention;

FIG. 2 is an enlarged fragmentary vertical sectional view as seen in the direction of arrows from the line II—II of FIG. 1;

FIG. 3 is a fragmentary vertical sectional view of a second photographic apparatus for use with differently configurated flashcubes;

FIG. 4 is a fragmentary horizontal sectional view as seen in the direction of arrows from the line IV—IV of FIG. 3;

DESCRIPTION OF THE PREFERRED EMBODIMENTS

Figure 5:
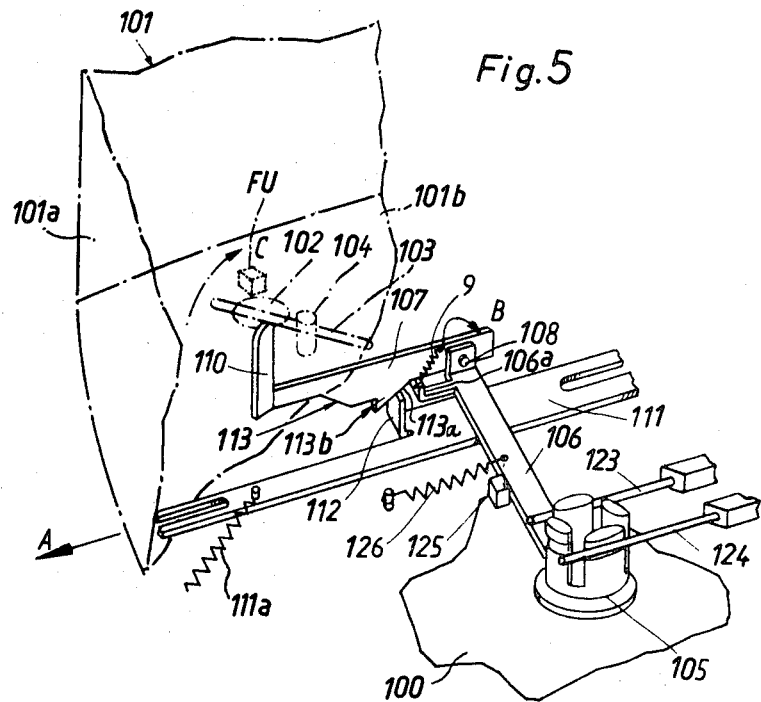
FIG. 5 is a fragmentary perspective view of a third photographic apparatus which utilizes flashcubes of the type wherein a lamp is fired in response to transmission of an impact to a piezoelectric element or to a cartridge.

Referring first to FIGS. 1 and 2, there is shown a still camera having a housing or body 1 including a top wall 1a. The latter is provided with a circular opening 1b for the downwardly extending coupling member or foot 14 of a source of artificial light here shown as a flashcube 70 with four flash lamps (not specifically shown but similar to the flash lamp 31 illustrated in FIG. 3). The foot 14 is separably connected with a coupling member or socket which comprises a base 19A (FIG. 2) and four equidistant elastomeric synthetic plastic detent elements or tongues 19, 20, 21 and 22 which extend upwardly from the base 19A. The foot 14 comprises four complementary detent elements 15, 16, 17, 18 which alternate with the elastomeric tongues 19 – 22 on the base 19A and serve as motion receiving portions of the flashcube 70. The detent elements or motion receiving portions 15 – 18 are angularly spaced from each other by 90 degrees and each of the elements 15 – 18 is flanked by two of the tongues 19 – 22 when the flashcube 70 is held in one of its four discrete positions in each of which one of its flash lamps is in an optimum position to illuminate the subject when the picture taking lens 101 of the camera is trained upon the subject. The camera body 1 supports two leaf springs 23, 24 which constitute biasing means serving to yieldably urge the adjacent tongues 19 and 21 against the foot 14.

The drive means for moving (rotating or indexing) the foot 14 and hence the entire flashcube 70 with reference to the socket 19, 19A, 20, 21, 22 in the camera body 1 comprises a combined film transporting and shutter actuating mechanism. This mechanism comprises a manually actuatable rotary film advancing wheel 2 which has a shaft 2a connected with a takeup reel or spool (not shown) for roll film. The film is advanced to place a fresh film frame into registry with the picture taking lens 101 when the wheel 2 is rotated in a counterclockwise direction as indicated by the arrow A. The wheel 2 has a serrated or milled portion 3 which extends through a slot provided in a side wall of the body 1 so that it can be readily engaged by the hand of the operator. The wheel 2 further comprises two projections or lobes 4, 5 which are located diametrically opposite each other. It is assumed that, in order to advance the film by the length of a frame, the wheel 2 must be rotated through 180°; therefore, the wheel 2 is provided with two lobes 4, 5. If the wheel 2 is to be rotated through 360° or 120°, it comprises a single lobe or three equidistant lobes.

The drive means further comprises a reciprocable actuating member or slide 6 having an elongated slot 7 for a pin 8 which is mounted in the body 1. A helical spring 9 is connected to the slide 6 and to a post 9a in the body 1 and is mounted in such a way that it tends to pivot the member 6 in a clockwise direction, as viewed in FIG. 1, while at the same time tending to maintain the member 6 in its left-hand end position as shown in FIG. 1. The left-hand end portion of the slide 6 has a bent-over tooth 10 which can be engaged and pushed by the lobe 4 or 5 of the film transporting wheel 2.

The shutter of the camera comprises a blade 12 which is pivotable about a horizontal axis (i.e., about a vertical axis, as viewed in FIG. 1) and has a projection 12a extending into the path of movement of a projecting portion or arm 11 on the slide 6. A return spring 12b biases the shutter blade 12 to the illustrated uncocked position. When the spring 9 is free to rapidly advance the slide 6 to the illustrated position, the arm 11 strikes against the projection 12a and propels the shutter blade 12 to the open or cocked position whereby the blade permits scene light to reach an unexposed film frame behind the picture taking lens 101. The spring 12b thereby stores energy and automatically returns the blade 12 to the illustrated uncocked position as soon as the arm 11 has advanced beyond the projection 12a. It is clear that the camera of FIGS. 1 and 2 can employ a more sophisticated shutter with two or more blades and with means for adjusting the size of the opening which admits light when the shutter is open.

The slide 6 is further provided with a motion transmitting arm 13 which can engage the adjacent motion receiving element 15, 16, 17 or 18 of the foot 14 to rotate the foot and the entire flashcube 17 in a counterclockwise direction, as viewed in FIG. 1, when the slide 6 is moved to the right-hand end position in response to rotation of the film transporting wheel 2 so that the lobe 4 or 5 engages the tooth 10 and pushes the slide 6 against the opposition of the spring 9 to the extent determined by the length of the slot 7. The slide 6 also serves as a means for preventing repeated exposure of film frames and it permits the wheel 2 to advance the film only to the extent which is necessary to place a fresh film frame into registry with the lens 101. The reference character 25 denotes a release element which is depressible by hand from a starting position to thereby disengage the tooth 10 from the adjacent lobe 4 or 5 and to this permit the spring 9 to propel the slide to the end position shown in FIG. 1. The release element 25 has a cam face (not shown) which can engage the upper edge face of the slide 6 (as viewed in FIG. 1) to pivot the slide in a counterclockwise direction and to thereby disengage the tooth 10 from the lobe 4 or 5.

At least one of the elastomeric tongues 19 – 22 is provided with a protuberance 26 which is flanked by cam faces extending substantially radially and axially of the foot 14. The axially extending cam faces of the protuberances 26 engage with complementary cam faces provided on the protuberances 27 of the motion receiving elements 15 – 18 to yieldably hold the foot 14 in the socket 19 – 22, 19A in such a way that the foot can be rotated by the arm 13 of the slide 6. Since the flashcube 70 is assumed to contain four equidistant lamps, the socket in the body 1 comprises four equidistant detent elements or tongues 19 – 22 and the foot 14 comprises four equidistant motion receiving elements 15 – 18 which alternate with the tongues 19 – 22 when the flashcube dwells in one of its four discrete positions in each of which a different lamp faces the subject.

In the first step, the user of the camera attaches to the socket 19A, 19–22 a fresh flashcube 70 by forcing the motion receiving elements 15 – 18 of the foot 14 between the toungues 19 – 22 so that the parts 15 – 22 assume the positions shown in FIG. 1. The leaf springs 23, 24 yield during attachment of the flashcube 70 to the body 1.

The slide 6 is assumed to dwell in the end position shown in FIG. 1 in which the pin 8 is located in the right-hand end portion of the slot 7. The slide 6 assumes such end position upon completion of an exposure. Repeated depression of the release element 25 from its starting position cannot result in repeated admission of light against the once-exposed film frame because the arm 11 of the slide 6 is located to the left of the projection 12a on the shutter blade 12 which dwells in the uncocked position.

If the user wishes to make an exposure, the serrated portion 3 of the film transporting wheel 2 is rotated in a counterclockwise direction (arrow A in FIG. 1) whereby the shaft 2a rotates the takeup reel in a direction to draw the film from the supply reel (not shown). The lobe 5 of the wheel 2 moves toward and ultimately engages the tooth so as to push the slide 6 against the opposition of the spring 9 along a first path (arrow B) which is substantially horizontal, as viewed in FIG. 1. The user continues to rotate the wheel 2 in a counterclockwise direction until the internal surface at the left-hand end of the slot 7 reaches the pin 8 to thus prevent further rightward movement (arrow B in FIG. 1) of the slide 6. During rightward movement of the slide 6, the arm 13 engages the adjacent motion receiving element 18 and rotates the flashcube 70 in a counterclockwise direction (arrow C in FIG. 1). The arrangement is such that the arm 13 turns the foot 14 through an angle of at least 45 degrees whereupon the elastomeric tongues 19 – 22 (and particularly the leaf springs 23 – 24) insure that the foot 14 continues to rotate in order to complete an angular movement through 90° and to thus insure that a fresh (unfired) lamp of the flashcube 70 faces the subject. While the foot 14 rotates, the motion receiving elements 15 – 18 cause the tongues 19 – 22 to move apart but the tongues thereupon enter the adjoining spaces between the motion receiving elements to insure satisfactory retention of the foot in the socket but in such a way that, if necessary or desired, the foot can be extracted in response to exertion of a force which deforms the tongues 19 – 22 while the protuberances 27 slide along the adjacent protuberances 26.

A fresh film frame is located in registry with the lens 101 when the pin 8 is disposed in the left-hand end portion of the slot 7, i.e., upon completed indexing of the flashcube 70 through 90° and upon completed stressing of the spring 9.

The exposure is made by depressing the release element 25. The aforementioned inclined cam face of the release element 25 thereby engages the adjacent edge face of the slide 6 which is caused to turn on the pin 8 (arrow D) so that its tooth 10 moves radially outwardly along the radially extending flank of the lobe 5 on the film transporting wheel 2. When the tooth 10 moves beyond the lobe 5, the spring 9 is free to undergo an abrupt contraction and propels the slide 6 toward the position shown in FIG. 1. It will be noted that the path (arrow E) along which the slide 6 moves toward the position shown in FIG. 1 is different from the path (arrow B) along which the slide is moved by the lobe 4 or 5 of the film transporting wheel 2. This is desirable in order to insure that the arm 13 can bypass the motion receiving elements 15 – 18 of the foot 14 when the spring 9 is free to contract. During movement of the slide 6 under the action of the spring 9, the arm 11 strikes against the projection 12a and propels the shutter blade 12 to its open or cocked position to thereby stress the return spring 12b. The spring 12b automatically returns the shutter blade 12 to the illustrated uncocked or closed position to thereby complete the exposure as soon as the arm 11 advances beyond the projection 12a. The projection 12a and/or the arm 11 is preferably provided with a suitable inclined cam face (not shown) which enables the arm 11 to ride over the projection 12a without changing the position of the shutter blade 12 when the slide 6 is pushed to its right-hand end position (arrow B) by the lobe 4 or 5 in response to rotation of the wheel 2 in the direction indicated by the arrow A.

The camera is thereupon ready for the next exposure which can be made upon completed transport to the film by the length of a frame. During such transport of the film, the tooth 10 of the slide 6 is engaged and pushed by the lobe 4.

FIGS. 3 and 4 illustrate a portion of a second camera which can be utilized with a modified flashcube 30 having four equidistant lamps 31 and a different coupling member or foot 32. The illustrated lamp 31 is assumed to be in an optimum position for illumination of the subject when the subject can be observed through the viewfinder of the camera.

The foot 32 of the flashcube 30 includes a centrally located portion of substantially triangular outline (see FIG. 4) which is received between two or more elastic tongues 33a of a socket or coupling member 33 when the flashcube is properly attached to the camera body 1A. The socket 33 has a chamber for a helical spring 34 which biases a displacing link 35 in an upward direction, as viewed in FIG. 3, so that the link 35 extends into the path of movement of the triangular portion of the foot 32 during attachment of the flashcube 30 to the camera body 1A. The link 35 is articulately connected with a displacing lever 36 which is fulcrumed in the camera body 1A, as at 37, and one arm of which is articulately connected with a vertically reciprocable displacing member or carrier 38 for a toothed member here shown as a pinion or gear 39. The foot of the flashcube 30 further comprises a lower or inner end portion which is received in the opening 1B of the top wall of the body 1A and is provided with a second toothed member in the form of a ring gear 40. When the flashcube 30 is properly attached to the body 1A, the displacing link 35 is depressed against the opposition of the spring 34 in the socket 33 and the lever 36 is held in that angular position in which the carrier 38 maintains the teeth of the pinion 39 in mesh with the teeth of the ring gear 40. The film transporting and/or shutter actuating mechanism of the camera comprises a gear train or a toothed rack 139 which meshes with the pinion 39 at least when the latter dwells in the operative or raised position shown in FIG. 3 so that the rack 139 can rotate the pinion 39 to thereby index the flashcube 30 through an angle of 90° in response to cocking of the shutter and/or in response to transport of the film by the length of a frame. The rack 139 can be said to constitute a component of the film transporting and/or shutter actuating mechanism. The lever 36 is articulately coupled to the carrier 38 by a pin-and-slot connection shown in FIG. 3.

The spring 34 expands and moves the displacing link 35 for the pinion 39 to its raised position in response to withdrawal of triangular portion of the foot 32 from the chamber of the socket 33. The pinion 39 remains in its inoperative position until after proper insertion of a foot 32 into the chamber of the socket 33.

The manner in which the film transporting and/or shutter actuating mechanism (including the rack 139) transports the film and/or actuates the shutter is preferably analogous to that shown in FIG. 1. Thus, the rack 139 can receive motion from a slide 6 and/or from a film transporting wheel.

The camera of FIGS. 3 and 4 can be modified by replacing the ring gear 39 with an annular friction generating member at the lower end of the foot of a flashcube 30 and by replacing the pinion 39 with a friction wheel which is placed into frictional motion transmitting engagement with the annular friction generating member in response to insertion of the foot into the socket 33. The two friction generating members may consist of or may be coated with elastomeric material, such as rubber or the like. The means for rotating a flashcube whose foot is provided with an annular friction generating member may include a gear train or a reciprocable rack which meshes with a pinion secured to the friction wheel on the displacing means 35, 36, 38, at least when the friction wheel is moved to its operative position in which it bears against the annular friction generating member on the properly inserted foot of the flashcube. Such gear train or rack may form part of the film transporting and/or shutter actuating mechanism in the body 1A.

Figure 6:
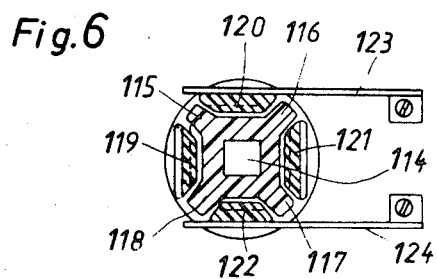
FIG. 6 is a horizontal sectional view of the first coupling member in the apparatus of FIG. 5.

Referring to FIGS. 5 and 6, the camera therein shown comprises a housing or body having a top wall 100 provided with a stationary coupling member or socket 105 for the coupling member or foot 114 of a source 101 of artificial light. The foot 114 is movable (indesible) with reference to the socket 105.

The source 101 is a flashcube having a casing 101a the bottom wall or panel 101b of which has four equidistant openings 102 (one shown). The illustrated opening 102 is located below a portion of an elastomeric (springy) impeller 103 which is normally held in the illustrated cocked position by an abutment 104 in the casing 101a. The impeller 103 serves to transmit impacts to one of four actuating or firing units FU provided in the casing 101a for the respective lamps, not shown. Each firing unit FU is mounted in or at the base of the respective lamp and causes the firing of such lamp in response to transmission thereto of an impact by the associated impeller 103.

A carrier in the form of a lever 106 is pivotable about the axis of rotation of the casing 101a with reference to the socket 105 or about an axis which is parallel to the axis of the casing. The carrier 106 supports an operating lever 107 which is fulcrumed thereon at 108 and is additionally coupled to the carrier 106 by a helical spring 109. The free end of the operating lever 107 is provided with a pin-shaped or otherwise configurated projection or protuberance 110 which can enter the illustrated opening 102 when he operating lever 107 is pivoted in a clockwise direction, as viewed in FIG. 5. A tensioning member in the form of a reciprocable slide 111 is mounted at a level below the operating lever 107 and is movable in a counter to the direction indicated by an arrow A. A projection 112 of the slide 111 constitutes a follower which can track an inclined cam face 113a provided on a cam 113 of the operating lever 107. The cam face 113a is followed by a shoulder 113b. The arrangement is such that, when the slide 111 is caused to move in the direction indicated by the arrow A, its follower 112 moves along the cam face 113a before it reaches the shoulder 113b. Therefore, when the slide 111 assumes the retracted position shown in FIG. 5 so that its follower 112 engages the cam face 113a, the spring 109 is free to maintain the operating lever 107 in such angular position that the protuberance 110 of the lever 107 is located below the level of the adjacent opening 102 in the bottom panel 101b of the casing 101a, i.e., the protuberance 110 does not engage the flashcube 101.

As shown in FIG. 6, the foot 114 is provided with four equidistant detent elements 115, 116, 117, 118 which alternate with detent elements or tongues 119, 120, 121, 122 of the socket 105. The tongues 120 and 122 are respectively biased against the foot 114 by leaf springs 123, 124 which are secured to the body of the camera above the top wall 100.

The operation of the structure shown in FIGS. 5 and 6 is as follows:

In the illustrated position, the protuberance 110 of the operating lever 107 is located below the illustrated opening 102 in the bottom panel 101b. The slide 111 is biased in the direction indicated by arrow A by a suitable spring 111a and can be freed for movement in such direction in response to depression of a release element such as the element 25 of FIG. 1. When the user of the camera wishes to make an exposure with flash, the foot 114 of the flashcube 101 is coupled to the socket 105 and the release element is depressed to permit contraction of the spring 111a which propels the slide 111 in the direction indicated by the arrow A. The follower 112 of the moving slide 111 travels along the inclined face 113a of the cam 113 to pivot the operating lever 107 in a clockwise direction (arrow B). The operating lever 107 causes the protuberance 110 to enter the casing 101a from below through the adjacent opening 102 and to disengage the impeller 103 from the abutment 104. This takes place when the operating lever 107 completes a pivotal movement through a predetermined angle whereby the impeller 103 transmits an impact to the adjacent firing unit FU which fires the associated flash lamp at the exact moment when the shutter (not shown) of the camera is open to admit scene light against an unexposed film frame.

As the slide 111 continues to advance in the direction indicated by the arrow A, the follower 112 engages the shoulder 113b of the cam 113 on the operating lever 107. If the slide 111 is thereupon moved counter to the direction indicated by the arrow A (for example, in response to cocking of the shutter or in response to actuation of the film transporting mechanism in order to advance the film by the length of a frame), the follower 112 remains in engagement with the shoulder 113b of the cam 113 and pivots the carrier 106 and the operating lever 107 in a clockwise direction as indicated by the arrow C. The members 106, 107 pivot about the axis of the socket 105 and the protuberance 110 (which continues to extend into the casing 101a through the opening 102) engages the surface surrounding the opening 102 to turn the flashcube 101 in a clockwise direction. As the flashcube 101 turns in the direction indicated by the arrow C, the elements 115 – 118 of its foot 114 deform the elastomeric tongues 119 – 122 of the socket 105 and thereby deform the leaf springs 123, 124. When the flashcube 101 completes an angular movement of at least 45°, it automatically continues to turn under the bias of the springs 123, 124 and elastomeric tongues 119 – 122 so that it comes to a halt after the casing 101a completes an angular movement through exactly 90° so that a fresh lamp is located in an optimum position for illumination of a subject or scene. The tongues 119 – 122 then reenter the spaces between the adjacent elements 115 – 119 and yieldably hold the foot 114 against uncontrolled angular movement with reference to the socket 105.

The shoulder 113b moves laterally with reference to the follower 112 while the casing 101a turns through the first 45° of its angular movement and the shoulder thereupon moves away from engagement with the follower so that the slide 111 can be returned to its cocked position without engaging the operating lever 107. The spring 109 is then free to pivot the separating lever 107 in a counterclockwise direction, as viewed in FIG. 5, in order to return the inclined cam face 113a into the path of movement of the follower 112. The carrier 106 has a stop 106a which arrests the operating lever 107 in such position that the protuberance 110 is located at a level below the bottom panel 101b of the casing 101a.

A spring 126 serves to urge the carrier 106 into abutment with a stop 125 on the top wall 100. The spring 126 is expanded by the carrier 106 while the latter pivots in the direction indicated by the arrow C, i.e., while the follower 112 engages the shoulder 113a during movement of the slide 111 to its cocked position (counter to the direction indicated by the arrow A). The spring 126 can contract to return the carrier 106 into abutment with the stop 125 as soon as the shoulder 113a moves laterally and away from registry with the follower 112. The protuberance 110 of the operating lever 107 is then located below the next-following opening 102 (not shown) and is ready to cause the firing of the respective lamp as soon as the slide 111 is released to the action of the spring 11a to move in the direction indicated by the arrow A. the release element is provided with suitable retaining means for normally holding the slide 111 in its cocked position in which the spring 11a stores energy.

The drive means 106, 107, 110, 111 of the structure shown in FIGS. 5–6 performs two functions, namely, to move the flashcube 101 between four discrete positions with reference to the camera body (in response to pivoting of the carrier 106 from the end position shown in FIG. 5 toward the other end position by means of the slide 111) and to operate the impeller 103 for that light-generating device (including a firing unit FU and the associated lamp) which occupies a predetermined position with reference to the camera body. Such operation of light-generating devices takes place in response to pivoting of the operating lever 107 while the carrier 106 dwells in the end position shown in FIG. 5. The slide 111 can form part of the film transporting and/or shutter operating means (see the slide 6 of FIG. 1).

The flashcube 101 of FIG. 5 can be replaced with an indexible source of artificial light having several (e.g. four) equidistant electronic flash units and piezoelectric blocks (replacing the firing units FU) which can receive impacts from the associated impellers 103 to thereby produce high-voltage pulses which are necessary for the firing of the respective electronic flash units. The manner in which the impellers of such modified light source can be released by the operating lever 107 is preferably identical with or analogous to that described in connection with FIG. 5.

It will be noted that the structure including the members 106, 107 and the slide 111 constitutes a drive which can move (index) the flashcube 101 (or a flashcube with several electronic flash units) with reference to a stationary coupling member (socket 105) in or on the body of the photographic apparatus. The members 106, 107 form a linkage which transmits motion to the impellers 103 and to the casing 101 in response to movements of the slide 111.

The camera of the present invention can employ light sources which are movable lengthwise with reference to the camera body. For example, a light source may be provided with one or more rows of flash lamps and with a coupling member or foot which is insertable into and movable lengthwise with reference to a socket having one or more guide rails for the foot. The drive means is then arranged to move the source lengthwise through such distances that a fresh lamp assumes a predetermined position with reference to the camera body in response to each actuation of the drive means.

It is further within the purview of the invention to employ drive means which comprises a gripper or claw movable along an endless path to index the light source by way of the foot or by way of the casing of the light source in response to each of its movements along the endless path.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising a body; a first coupling member provided in said body; a source of artificial light having a second coupling member connected with and movable relative to said first coupling member; and drive means mounted in said body and actuatable to move said source with said second coupling member with reference to said first coupling member.

2. A combination as defined in claim 1, wherein said source is a flashcube having a plurality of lamps and said second coupling member is rotatable with reference to said first coupling member.

3. A combination as defined in claim 1, wherein said second coupling member comprises a first friction generating portion and said drive means comprises a second friction generating portion which engages said first friction generating portion to move said source with reference to said first coupling member in response to actuation of said drive means.

4. A combination as defined in claim 3, wherein said drive means constitutes a film transporting mechanism.

5. A combination as defined in claim 3, further comprising shutter means movable between cocked and uncocked positions, said drive means comprising a portion which is arranged to effect the movement of said shutter means to one of said positions in response to actuation of said drive means to move said source by way of said friction generating portions.

6. A combination as defined in claim 3, wherein said second coupling member comprises an end portion and said first friction generating portion is of annular shape and is provided on said end portion.

7. A combination as defined in claim 3, wherein said second coupling member is separably connected with said first coupling member and further comprising displacing means arranged to move said second friction generating portion into frictional engagement with said first friction generating portion in response to connection of said second coupling member to said first coupling member.

8. A combination as defined in claim 7, wherein said displacing means comprises a linkage movably mounted in said body and supporting said second friction generating portion.

9. A combination as defined in claim 1, wherein said second coupling member comprises a first toothed member and said drive means comprises a second toothed member meshing with said first toothed member to move said source with reference to said first coupling member in response to actuation of said drive means.

10. A combination as defined in claim 9, wherein said drive means constitutes a film transporting mechanism which advances the film simultaneously with movement of said second toothed member to move said source with reference to said first coupling member by way of said first toothed member.

11. A combination as defined in claim 9, further comprising shutter means movable between cocked and uncocked positions, said drive means comprising a portion arranged to effect the movement of said shutter means to one of said positions in response to actuation of said drive means to move said source with reference to said first coupling member by way of said toothed members.

12. A combination as defined in claim 9, wherein said first toothed member is a ring gear and said second coupling member includes an end portion rigid with said ring gear.

13. A combination as defined in claim 9, wherein said second coupling member is separably connected with said first coupling member, and further comprising displacing means arranged to move said second toothed member into mesh with said first toothed member in response to connection of said second coupling member with said first coupling member.

14. A combination as defined in claim 13, wherein said displacing means comprises a linkage movably mounted in said body and supporting said second toothed member.

15. A combination as defined in claim 1 wherein said second coupling member is separably connected with said first coupling member and said first coupling member comprises detent means engaging said second coupling member to releasably secure said source to said body.

16. A combination as defined in claim 15, wherein said second coupling member is movable with reference to said first coupling member between a plurality of discrete positions and said detent means is arranged to yieldably hold said second coupling member in each of said discrete positions.

17. A combination as defined in claim 16, wherein said second coupling member comprises complementary detent means cooperating with said first mentioned detent means to releasably couple said source to said body in each of a plurality of discrete positions, at least one of said detent means consisting of elastomeric material.

18. A combination as defined in claim 1, wherein said source is a flashcube having a plurality of equidistant lamps and said second coupling member is rotatable with reference to said first coupling member and comprises a plurality of equidistant motion receiving portions, one for each of said lamps, said drive means having a motion transmitting portion arranged to rotate said flashcube by way of successive motion receiving portions in response to successive actuations of said drive means.

19. A combination as defined in claim 18, wherein said flashcube comprises four lamps and said first coupling member comprises detent means including elastic members alternating with said motion receiving portions and arranged to undergo deformation in response to rotation of said first coupling member on actuation of said drive means.

20. A combination as defined in claim 1, wherein said second coupling member is rotatable relative to and is separably connected with said first coupling member, and further comprising a plurality of elastomeric detent elements provided on said first coupling member and having cam faces extending substantially radially and axially of said second coupling member, said second coupling member having complementary cam faces engaging the axially extending cam faces of said detent elements to thus separably connect said second coupling member and said source with said first coupling member.

21. A combination as defined in claim 20, wherein said detent elements consist of elastomeric synthetic plastic material and are integral with said first coupling member.

22. A combination as defined in claim 20, further comprising resilient means mounted in said body and arranged to bias at least two of said detent elements against said second coupling member.

23. A combination as defined in claim 1, wherein said first coupling member includes elongated guide means and said second coupling member is movable lengthwise of said guide means.

24. A combination as defined in claim 1, wherein said drive means comprises a release element movable to and from a starting position, a shutter actuating member movable to a shutter actuating position in response to movement of said release element from said starting position, and means for moving said shutter actuating member from said shutter actuating position upon completed movement of said release element back to said starting position, said shutter actuating member having means for moving said second coupling member with reference to said first coupling member during movement of said shutter actuating member from said shutter actuating position.

25. A combination as defined in claim 1, wherein said drive means comprises a film transporting mechanism which is actuatable to transport the film by the length of a frame, said film transporting mechanism comprising means for moving said second coupling member with reference to said first coupling member during said transport of the film by the length of a frame.

26. A combination as defined in claim 1, further comprising shutter means movable between cocked and uncocked positions, said drive means comprising a portion arranged to move said shutter means to one of said positions during actuation of said drive means to move said source with said second coupling member with reference to said first coupling member.

27 A combination as defined in claim 1, wherein said drive means comprises a reciprocable member which is movable in a first direction along a first path to thereby move said second coupling member with reference to said first coupling member and in a second direction along a discrete second path.

28. A combination as defined in claim 27, wherein said reciprocable member is disengaged from said second coupling member during movement along said second path.

29. A combination as defined in claim 1, wherein said drive means comprises at least one gripper arranged To engage and to move said second coupling member with reference to said first coupling member in response to actuation of said drive means.

30. A combination as defined in claim 1, wherein said source comprises a plurality of discrete impact-responsive light-generating devices and impeller means operable to transmit impacts to said devices, said source being movable between a plurality of positions in each of which a different one of said devices occupies a predetermined position with reference to said body, said drive means comprising means for operating said impeller means so that said impeller means transmits an impact to the device which occupies said predetermined position before said source is moved with reference to said body to place a different device into said predetermined position.

31. A combination as defined in claim 30, wherein each of said devices comprises a lamp and a firing unit arranged to fire the respective lamp in response to transmission of an impact by said impeller means.

32. A combination as defined in claim 30, wherein said source comprises a plurality of discrete impeller means, one for each of said devices and said drive means further comprises carrier means supporting said operating means and movable between first and second positions to effect the transmission of an impact by one of said impeller means in response to movement to one of said positions and to effect a movement of said source to a different position with reference to said body in response to movement toward the other of said positions.

33. A combination as defined in claim 32, wherein said operating means is turnable with reference to said carrier means.

34. A combination as defined in claim 32, wherein said first and second coupling members comprise means for automatically completing the movement of said source from a preceding position to the next-following position in response to partial movement of said source beyond said preceding position.

35. A combination as defined in claim 32, wherein said drive means further comprises film transporting means having a portion arranged to move said carrier means between said positions thereof.

36. A combination as defined in claim 32, further comprising shutter means movable between closed and open positions, said drive means further comprising means for moving said shutter means to one of said positions and for moving said carrier means between said first and second positions.

37. A combination as defined in claim 32, wherein said operating means is disengaged from said source in the second position of said carrier means.

38. A combination as defined in claim 30, wherein said source is indexible with reference to said body.

39. A combination as defined in claim 32, wherein said carrier means and said operating means of said drive means constitute a linkage.

40. A combination as defined in claim 32, wherein said operating means comprises a protuberance and said source comprises a portion having a plurality of openings through which said protuberance can reach said impeller means in response to movement of said carrier means to said first position and by means of which said operating means moves said source with reference to said body in response to movement of said carrier means toward said second position.

* * * * *